US012800084B2

(12) United States Patent
Foley

(10) Patent No.: US 12,800,084 B2
(45) Date of Patent: Nov. 17, 2026

(54) PROVIDING HOSE COUPLING PROTECTION

(71) Applicant: Howe & Howe Inc., Waterboro, ME (US)

(72) Inventor: Timothy Merlin Foley, Lyman, ME (US)

(73) Assignee: Howe & Howe Inc., Waterboro, ME (US)

( * ) Notice: Subject to any disclaimer, the term of this patent is extended or adjusted under 35 U.S.C. 154(b) by 0 days.

(21) Appl. No.: 19/095,396

(22) Filed: Mar. 31, 2025

(65) Prior Publication Data

US 2025/0320948 A1 Oct. 16, 2025

Related U.S. Application Data

(60) Provisional application No. 63/632,656, filed on Apr. 11, 2024.

(51) Int. Cl.
*F16L 57/02* (2006.01)
*A62C 33/04* (2006.01)

(52) U.S. Cl.
CPC .............. *F16L 57/02* (2013.01); *A62C 33/04* (2013.01)

(58) Field of Classification Search
CPC .......... A62C 33/04; F16L 57/02; F16L 57/04; F16L 57/005; F16L 57/00; F16L 55/168; F16L 55/17; F16L 55/1705; F16L 55/1715; F16L 58/18; F16L 58/182; F16L 58/184; F16L 58/185; F16L 58/187; F16L 21/06
See application file for complete search history.

(56) References Cited

U.S. PATENT DOCUMENTS

| | | | |
|---|---|---|---|
| 5,015,013 A * | 5/1991 | Nadin | H02G 3/0691 285/903 |
| 5,895,076 A * | 4/1999 | Elliott | F16L 35/00 285/419 |
| 7,938,457 B2 | 5/2011 | Weinhandl et al. | |
| 8,096,588 B2 | 1/2012 | Winzeler | |

(Continued)

FOREIGN PATENT DOCUMENTS

| | | |
|---|---|---|
| DE | 202009016444 U1 | 8/2010 |
| EP | 2276960 B1 | 6/2013 |

(Continued)

OTHER PUBLICATIONS

International Search Report and Written Opinion for International Application No. PCT/US2025/022278, dated Jun. 20, 2025, 11 pages.

*Primary Examiner* — Aaron M Dunwoody
(74) *Attorney, Agent, or Firm* — BainwoodHuang

(57) ABSTRACT

A hose coupling protection apparatus includes a cover assembly constructed and arranged to install around a set of hose couplings which connects a first hose and a second hose. The cover assembly provides a smooth outer covering around the set of hose couplings when the cover assembly is installed around the set of hose couplings. In some arrangements, the cover assembly includes a first casing section and a second casing section, the first casing section and the second casing section being constructed and arranged to install around the set of hose couplings when fitted around the set of hose couplings and brought together into engagement (e.g., via snap-fit features).

20 Claims, 8 Drawing Sheets

(56) References Cited

U.S. PATENT DOCUMENTS

| | | | | |
|---|---|---|---|---|
| 8,740,254 | B2 | 6/2014 | Mason | |
| 9,273,811 | B1 | 3/2016 | Webber | |
| 9,625,071 | B2 | 4/2017 | Melo et al. | |
| 10,584,818 | B2 | 3/2020 | Blake et al. | |
| 2008/0221469 | A1 * | 9/2008 | Shevchuk | F16L 33/23 96/10 |
| 2016/0084423 | A1 | 3/2016 | Bélisle | |
| 2023/0417355 | A1 * | 12/2023 | Petry | B29C 66/54721 |

FOREIGN PATENT DOCUMENTS

| | | | |
|---|---|---|---|
| EP | 2503206 | B1 | 3/2021 |
| FR | 3113510 | A1 | 2/2022 |

* cited by examiner

PROVIDING HOSE COUPLING PROTECTION

CROSS REFERENCE TO RELATED APPLICATIONS

This application is a regular utility application based on earlier-filed U.S. Application No. 63/632,656 filed on Apr. 11, 2024, entitled "Providing Hose Coupling Protection", the contents and teachings of which are hereby incorporated by reference in their entirety.

BACKGROUND

Firehoses carry water or other fire retardant from sources to fires to extinguish the fires. Such firehoses typically have threaded couplings (or other connecting hardware) enabling the firehoses to connect with each other for extended range.

Such firehoses may further connect to vehicles (e.g., to enable fires to be extinguished from nozzles on the vehicles). Along these lines, a series of connected firehoses may connect to a robotic vehicle which moves toward a fire and sprays from a nozzle to extinguish the fire while a human operator remains at a safe distance.

SUMMARY

Unfortunately, there are deficiencies to situations in which firehoses simply connect together. Along these lines, such firehoses are often dragged across ground surfaces (e.g., roads, fields, rougher terrain, combinations thereof, etc.) which may cause extensive firehose wear and/or damage (e.g., cracked or broken couplings, ripped or torn fabric/material, combinations thereof, etc.). Often such firehose wear and/or damage is due to the hose sections and/or couplings snagging (or catching) on obstructions, due to friction between the hose material and the ground as the firehoses are dragged across coarse or sharp surfaces, due to the couplings being dropped onto or colliding with hard surfaces while being pulled around, and so on. For example, if the firehose couplings catch on a snag point and become immobilized, the couplings may then break due to added stress, the neighboring hose material may tear or escape from the couplings and/or suffer excessive wear due to stresses from the snag point, and so on.

Improved techniques involve utilizing hose coupling protection apparatus that protect hose couplings which connect hoses together. Such apparatus includes cover assemblies that provide smooth outer coverings around the hose couplings when the cover assemblies are installed around the hose couplings. The cover assemblies not only protect the hose couplings against wear and/or damage (e.g., by shielding the couplings), the cover assemblies also reduce (or remove) the opportunities for the couplings to catch on snag points and lifts portions of the hoses off the ground to lower friction between the hoses and the ground. Accordingly, there is less hose fabric/material wear, and less chance for the hoses to become caught or immobilized on snag points. Moreover, the cover assemblies may serve as buffers against hard impacts to prevent damage (e.g., when dropped, when knocked against other couplings and/or other hard objects, etc.).

One embodiment is directed to a hose coupling protection apparatus which includes a cover assembly constructed and arranged to install around a set of hose couplings which connects a first hose and a second hose. The cover assembly provides a smooth outer covering (or shield) around the set of hose couplings when the cover assembly is installed around the set of hose couplings.

Another embodiment is directed to a hose coupling protection system which includes a set of hose couplings and a cover assembly. The set of hose couplings connects a first hose and a second hose. The cover assembly is constructed and arranged to install around the set of hose couplings. The cover assembly provides a smooth outer covering around the set of hose couplings when the cover assembly is installed around the set of hose couplings.

Yet another embodiment is directed to a method of providing hose coupling protection. The method includes:
(A) coupling together hose couplings to connect a first hose and a second hose;
(B) after the hose couplings are coupled together, placing the hose couplings onto a first casing section; and
(C) after the hose couplings are placed onto the first casing section, bringing a second casing section into engagement with the first casing section to form a cover assembly which fits around the hose couplings and provides a smooth outer covering.

In some arrangements, at least one of the first and second casing sections defines a set of snap-fit beams. Additionally, at least another of the first and second casing sections defines a set of alignment grooves and shelves. Furthermore, bringing the second casing section into engagement with the first casing section includes aligning the set of snap-fit beams with the set of alignment grooves and shelves and snap-fitting the first and second casing sections together to form the cover assembly.

In some arrangements, the method further includes actuating the set of snap-fit beams relative to the set of alignment grooves and shelves to disengage the first casing section and the second casing section from each other.

In some arrangements, the cover assembly defines a first end section which extends around an end of the first hose, a second end section which extends around an end of the second hose, and a midsection which interconnects the first end section with the second end section. The midsection has a larger outer diameter than the first end section and the second end section to lift the ends of first and second hoses above a ground surface when the cover assembly is installed around the set of hose couplings. Such a feature removes the opportunity for the set of hose couplings to catch (or snag) on snag points, reduces friction between the hoses and the ground surface, and so on.

In some arrangements, the cover assembly is constructed and arranged to rotate relative to the set of hose couplings when the cover assembly is installed around the set of hose couplings. For example, while the set of hose couplings remain properly in position to keep the hoses together, the cover assembly rotates about the set of hose couplings to concurrently provide shielding and improved hose mobility.

In some arrangements, the cover assembly encapsulates the set of hose couplings to protect the set of hose couplings against damage from a ground surface when the cover assembly is installed around the set of hose couplings. Accordingly, coupling features such as aluminum casted bodies, tabs/protrusions, fittings, etc. are protected against wear, damage from hitting objects or falling onto hard surfaces, and so on.

In some arrangements, the cover assembly is constructed and arranged to hold the set of hose couplings together to maintain connection between the first hose and the second hose when the cover assembly is installed around the set of hose couplings. Here, the cover assembly may prevent hose coupling hardware from inadvertently turning and disconnecting, may prevent excessive leakage from the couplings, may provide strain relief, and so on.

In some arrangements, the set of couplings includes a first firehose coupling and a second firehose coupling. Additionally, the first firehose coupling and the first hose form a first firehose assembly. Furthermore, the second firehose coupling and the second hose form a second firehose assembly. Also, the cover assembly defines a firehose coupling chamber to encapsulate the first and second firehose couplings when the cover assembly is installed around the first and second firehose couplings. Such a coupling chamber may include extra space to avoid interfering with the firehose couplings.

In some arrangements, the cover assembly defines a set of drain ports to drain off any fluid that leaks from the first and second firehose couplings when the cover assembly is installed around the first and second firehose couplings.

In some arrangements, the cover assembly includes a first casing section and a second casing section. The first casing section and the second casing section are constructed and arranged to install around the set of hose couplings when fitted around the set of hose couplings and brought together into engagement.

In some arrangements, the first casing section defines an elongated raised boss. Additionally, the second casing section defines an elongated pocket. Furthermore, the elongated raised boss defined by the first casing section engages with the elongated pocket defined by the second casing section when the first casing section and the second casing section are fitted around the set of hose couplings and brought together into engagement. Such features prevent the sections from inadvertently sliding apart, catching on debris, or otherwise disengaging, etc.

In some arrangements, the second casing section further defines an elongated raised boss. Additionally, the first casing section further defines an elongated pocket. Furthermore, the elongated raised boss defined by the second casing section engages with the elongated pocket defined by the first casing section when the first casing section and the second casing section are fitted around the set of hose couplings and brought together into engagement.

In some arrangements, the first casing section defines a set of snap-fit beams. Additionally, the second casing section defines a set of alignment grooves and shelves. Furthermore, the set of snap-fit beams defined by the first casing section snap-fits into place over the set of alignment grooves and shelves defined by the second casing section when the first casing section and the second casing section are fitted around the set of hose couplings and brought together into engagement. Such snap-fitting facilitates robust and reliable locking of the sections together.

In some arrangements, the second casing section further defines a set of snap-fit beams. Additionally, the first casing section further defines a set of alignment grooves and shelves. Furthermore, the set of snap-fit beams defined by the second casing section snap-fits into place over the set of alignment grooves and shelves defined by the first casing section when the first casing section and the second casing section are fitted around the set of hose couplings and brought together into engagement.

Other embodiments are directed to systems, sub-systems and apparatus, assemblies, and so on. Some embodiments are directed to various installation methods, methods of use, methods of operation, mechanisms and/or componentry which are involved in providing hose coupling protection.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves utilizing a hose coupling protection apparatus that protects hose couplings which connect hoses together. Such an apparatus includes a cover assembly that provides a smooth outer covering around the hose couplings when the cover assembly is installed around the hose couplings. The cover assembly protects the hose couplings against damage and/or wear. Along these lines, the cover assembly reduces (or removes) the opportunity for the hose couplings to catch on snag points, and lifts portions of the hoses off the ground. Accordingly, there is less opportunity for the hoses to become caught or immobilized on snag points, stressed, torn, etc. Moreover, the cover assembly may serve as a buffer against hard impacts to prevent damage (e.g., when dropped, when knocked against other couplings and/or other hard objects, etc.).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
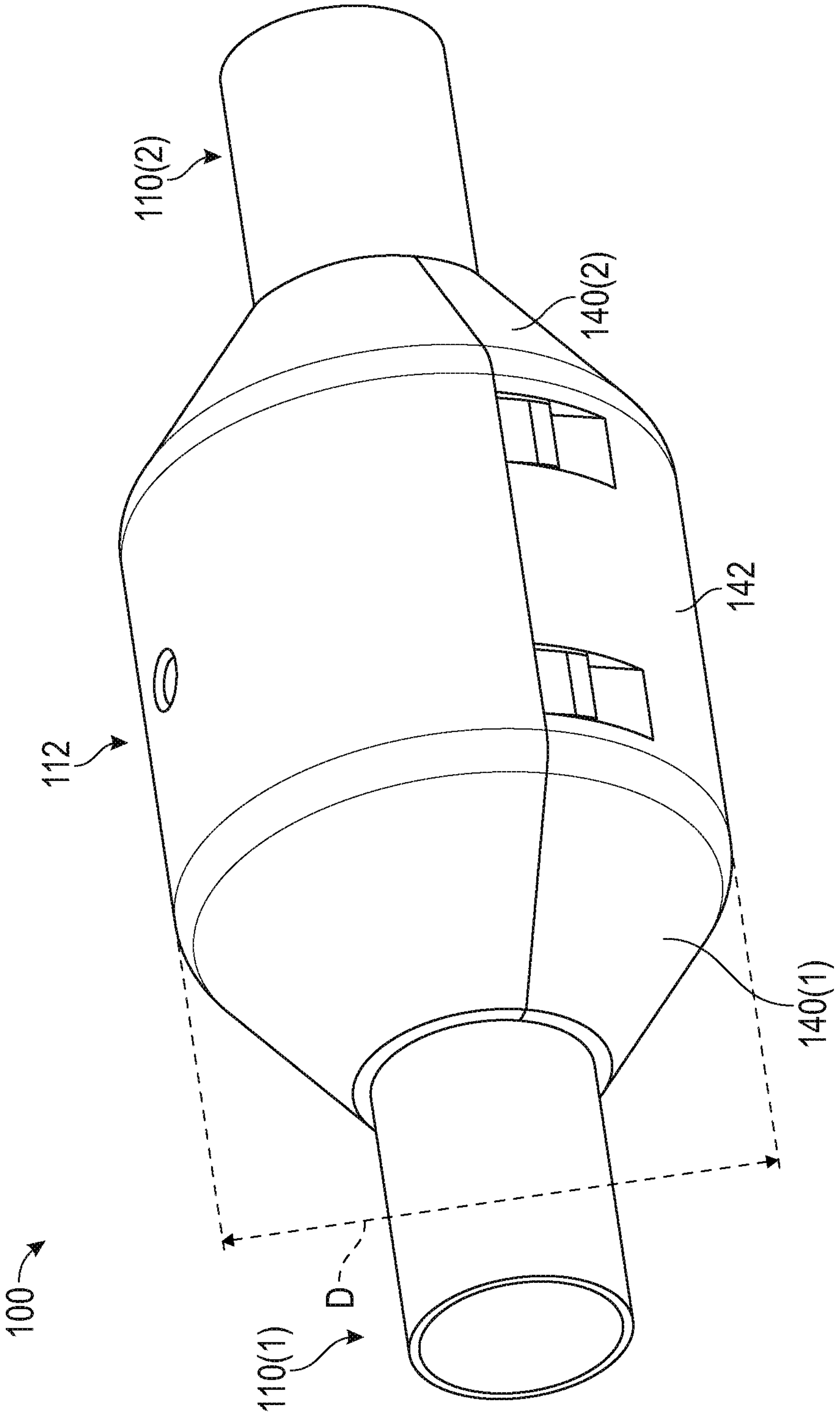
FIG. 1 is a perspective view an assembled hose system in accordance with certain embodiments.
Figure 2:
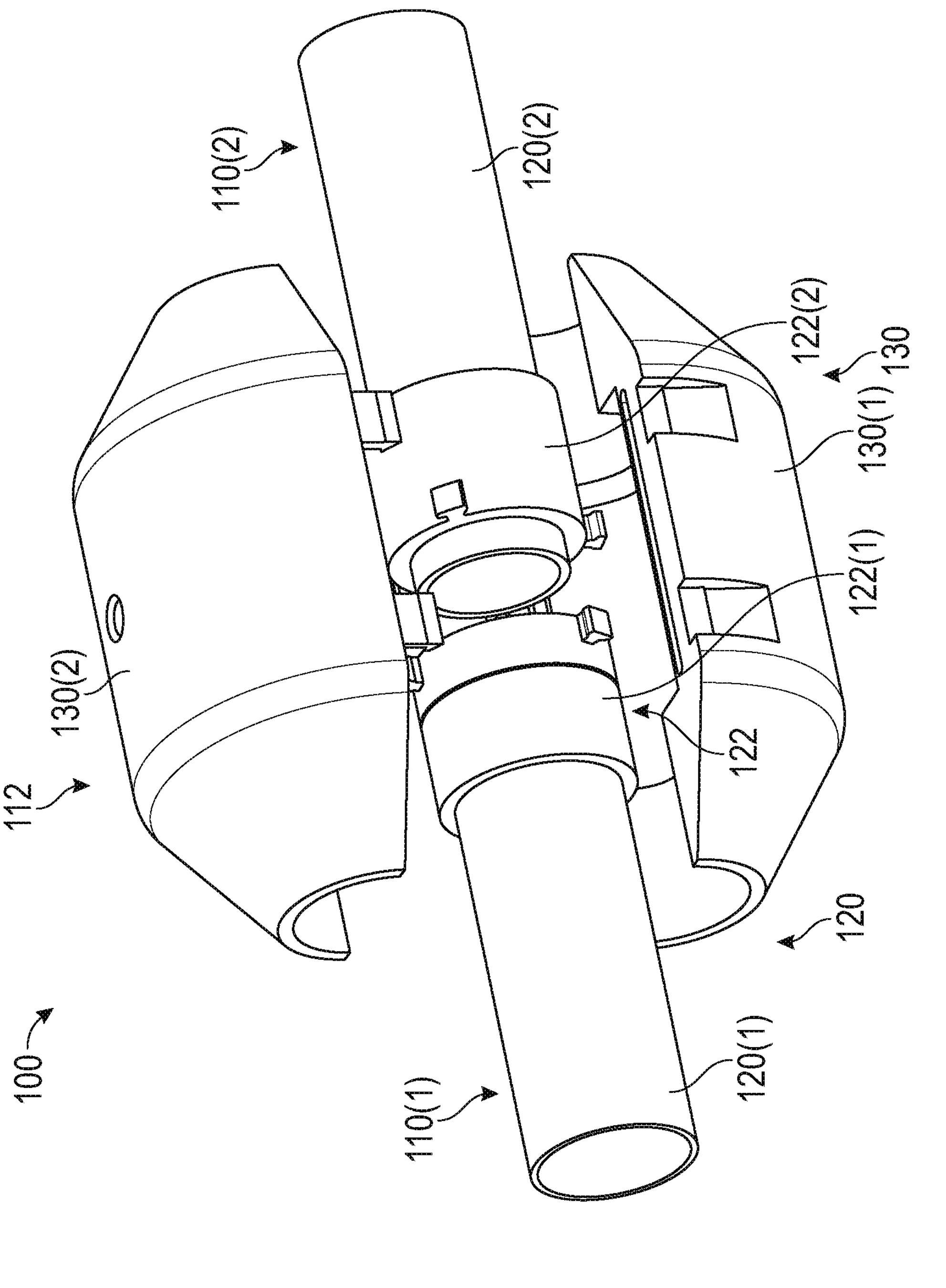
FIG. 2 is an exploded view of the hose system in accordance with certain embodiments.

FIGS. 1 and 2 show a hose system 100 in accordance with certain embodiments. FIG. 1 is a perspective view of the hose system 100 in an assembled state. FIG. 2 is an exploded (or disassembled) view of the hose system 100.

The hose system 100 includes a first hose 110(1), a second hose 110(2), and a cover assembly 112. When the hose system 100 is in the assembled state as shown in FIG. 1, the first and second hoses 110(1), 110(2) (collectively, the hoses 110) connect in series to convey fluid from one location to another, and the cover assembly 112 covers the ends of the hoses 110 to protect against hose damage.

The hoses 110 include hose sections (or sections of hoses) 120 and connection hardware 122 (hereinafter referred to as "couplings") on the ends of the hose sections 120 (FIG. 2). Along these lines, the first hose 110(1) includes a hose section 120(1) and a coupling 122(1) on an end of the hose section 120(1). Similarly, the second hose 110(2) includes a hose section 120(2) and a coupling 122(2) on an end of the hose section 120(2).

The hose sections 120 are constructed and arranged to provide fluid paths through which fluid under pressure may travel. Such hose sections 120 may be made of rubber, plastic, fabric, canvas, combinations thereof, etc.

The couplings 122 are constructed and arranged to couple (or link) the hose sections 120 together or to other equipment (e.g., to a fluid source, to a nozzle, to a vehicle, etc.). Such couplings 122 are intended to broadly refer to a variety of connection hardware such as threaded male connectors, threaded female connectors, adaptors, special clamping-style hardware, combinations thereof, and so on. Such hardware may include certain metals/alloys such as aluminum, copper, steel, etc. and/or plastics, elastomeric materials, and so on.

In some arrangements, the ends of the sections of hoses 120 are tightly clamped or fastened to the couplings 122. Nevertheless, these attachment points are often the weak points along the hose path which may be prone to snagging and sustaining the most damage.

The cover assembly 112 is constructed and arranged to protect a set of the couplings 122 (e.g., the couplings 122(1) and 122(2)) while the set of couplings 122 connect two hoses 110 together. Along these lines, the cover assembly 112 installs around the set of couplings 122 and provides a smooth outer surface to reduce the likelihood of the hoses 110 snagging on objects and thus being overstressed, damaged, and so on.

As shown in FIG. 2, the cover assembly 112 is formed by multiple casing sections 130(1), 130(2) (collectively, casing sections or simply casings 130). Such casings 130 may be of durable light weight material such as plastic, rubber, metal, combinations thereof, etc. Such material may have certain properties that are well suited to protecting the hose couplings 122 such as ruggedness, resiliency, water repelling, compliant/flexible, combinations thereof, and so on.

In some arrangements, the casings 130 are provided as "halves" such that two casings 130, when assembled, form a full cover assembly 112. However, in other arrangements, a full cover assembly 112 is formed from a different number of casings 130 (e.g., from three casings 130 as thirds, from four casings 130, etc.).

Additionally, in some arrangements, the casings 130 are identical thus enabling a manufacturer to make the casings 130 from a single model. Nevertheless, nothing precludes the casings 130 from being different from each other (e.g., different sizes, different geometries, combinations thereof, etc.).

In accordance with certain embodiments, the cover assembly 112 includes end sections 140(1), 140(2), and a midsection 142 which interconnects the end sections 140(1), 140(2) (e.g., see FIG. 1). The end sections 140(1), 140(2) serve as sleeves which extend around the ends of hose sections 120 and enable the set of couplings 122 to be captured/held within the cover assembly 112.

As best seen in FIG. 1, the midsection 142 has a diameter (D) which is wider than that of the hoses 110. Additionally, the end sections 140(1), 140(2) become narrower (or taper) from the midsection 142 toward the hoses 110 such that the diameter (D) of the midsection 142 is greater than or equal to the diameters of the end sections 140(1), 140(2). Along these lines, the diameters of the end sections 140(1) transition from the diameter (D) down to roughly the diameters of the hose sections 120 themselves. Accordingly, when the cover assembly 112 is installed around the set of couplings 122 and deployed in field, the cover assembly 112 is able to lift the ends of hose sections 120 above the ground surface to lower friction between the hoses 110 and the ground surface thus reducing wear.

As will be explained in further detail shortly, the cover assembly 112 has certain advantageous features. Such features include being easy to install, being lightweight, being durable, and being shaped to prevent hose damage.

Although FIG. 1 shows only two hoses 110 connected in this manner, it should understood that the hose system 100 may include more hoses 110 (e.g., three, four, etc.). Such hoses 110 may serially connect together to provide an extended fluid pathway. Additionally, the hose system 100 may include more cover assemblies 112 which install around sets of couplings 122 connecting the hoses 110.

By way of example, the hoses 110 are firehoses which are capable of carrying firefighting liquid (e.g., water, flame retardant mixtures, gas, combinations thereof, etc.). Accordingly, the couplings 122 are constructed and arranged to connect with each other, to hydrants, to vehicles, to nozzles, and so on. Such couplings 122 may be made of metal (e.g., casted aluminum and/or other metals) and may have a variety of connector/fitting geometries, shapes, configurations, and so on. Further details will now be provided with reference to FIGS. 3 through 8.

Figure 3:
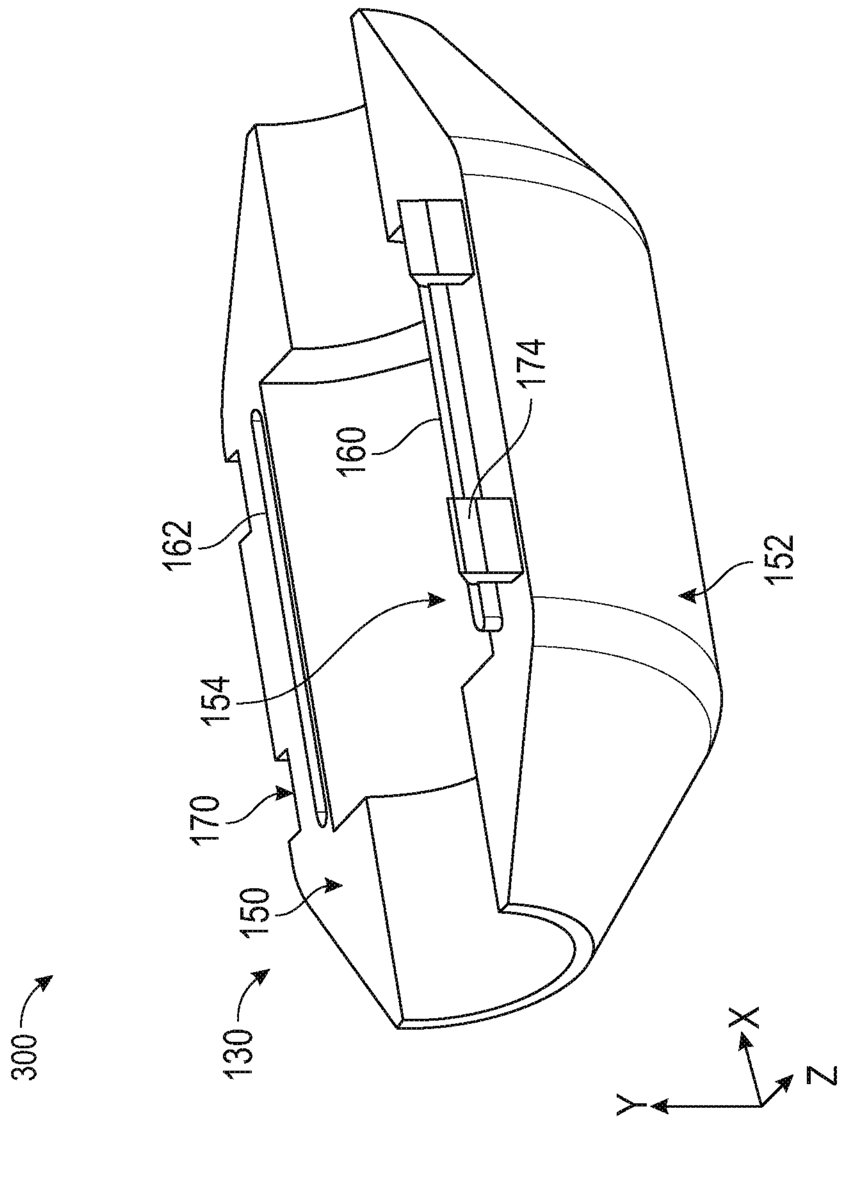
FIG. 3 is a perspective view of an example portion of the hose system in accordance with certain embodiments.
Figure 4:
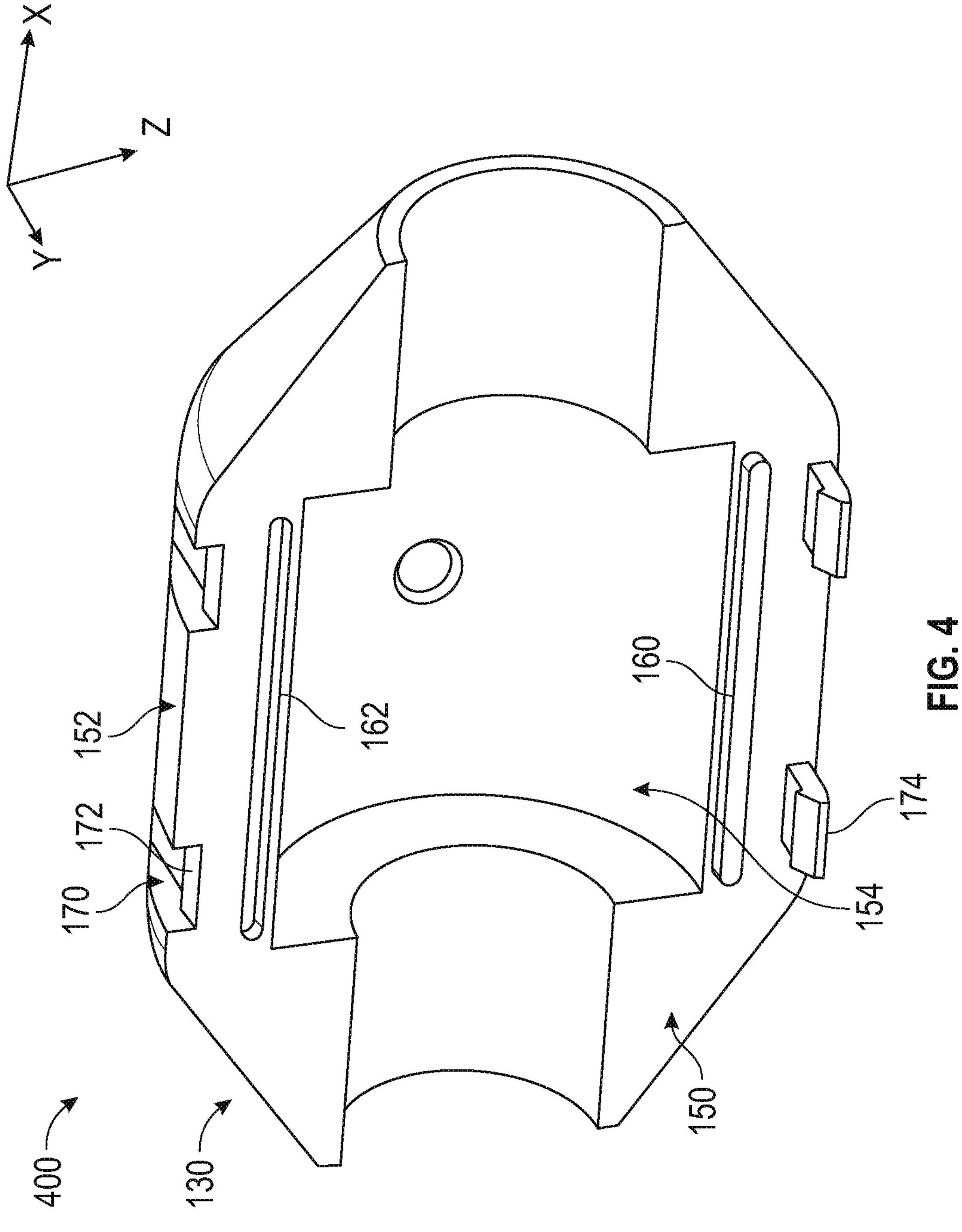
FIG. 4 is another perspective view of the example portion of the hose system in accordance with certain embodiments.
Figure 5:
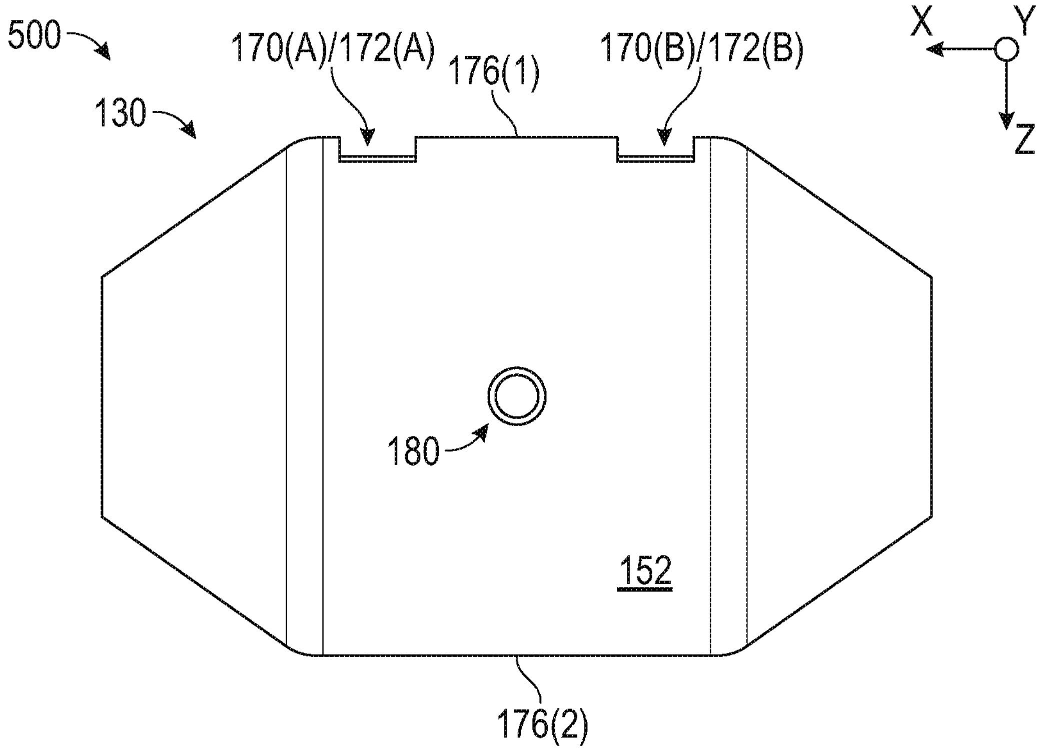
FIG. 5 is a top view of the example portion of the hose system in accordance with certain embodiments.
Figure 6:
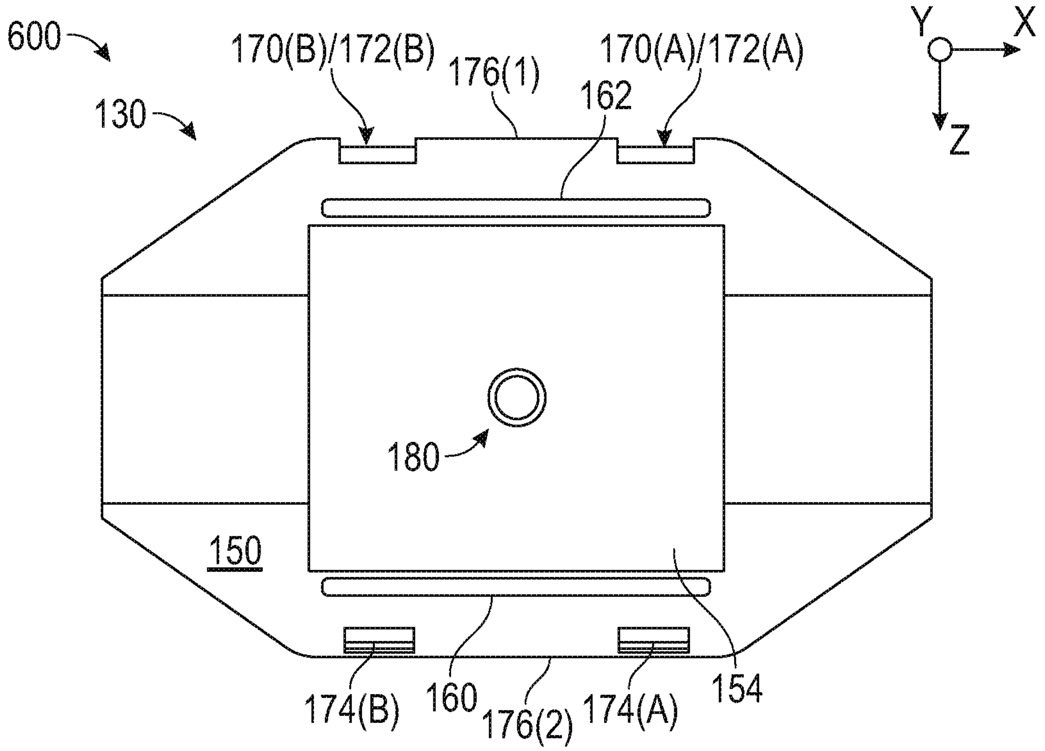
FIG. 6 is a bottom view of the portion of the hose system in accordance with certain embodiments.
Figure 7:
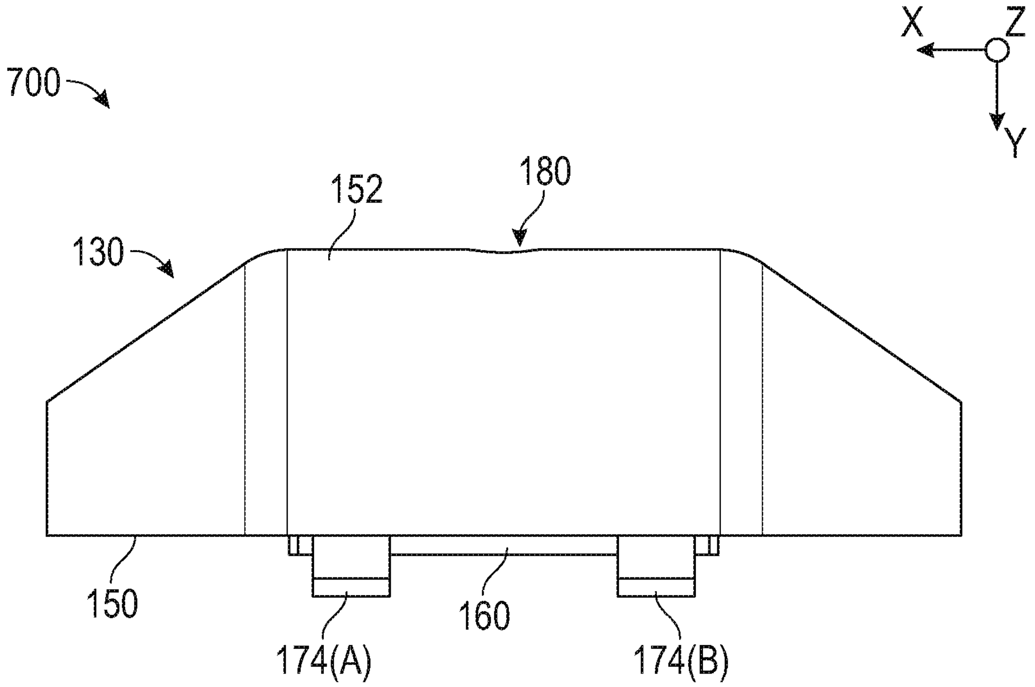
FIG. 7 is a first side view of the example portion of the hose system in accordance with certain embodiments.
Figure 8:
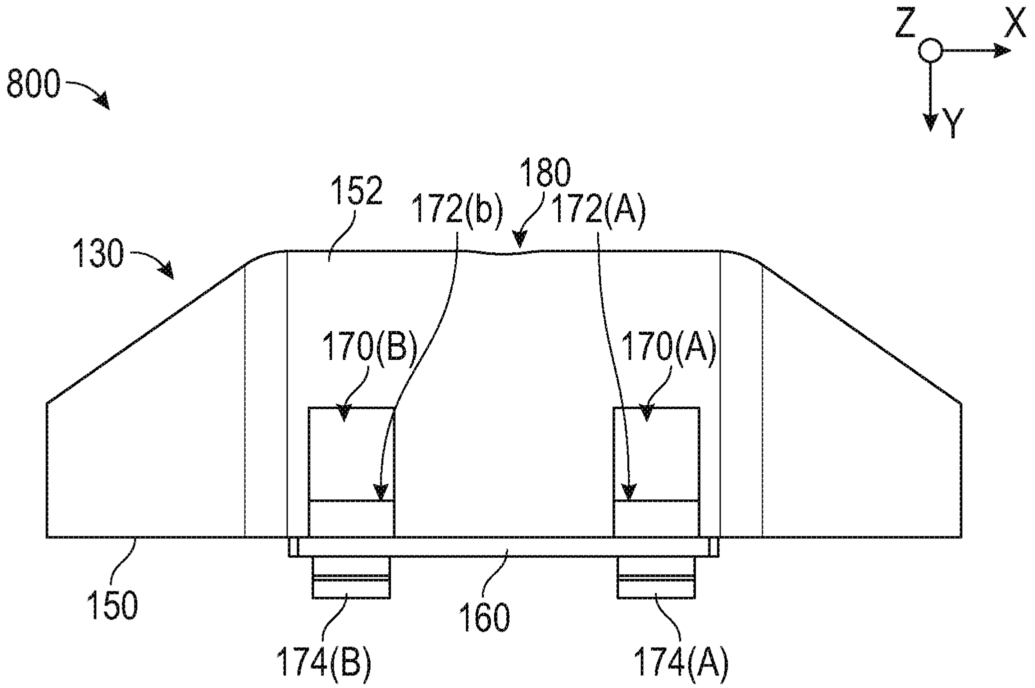
FIG. 8 is a second side view of the example portion of the hose system in accordance with certain embodiments.

FIGS. 3 through 8 show various details of an example casing section 130 which is suitable for forming at least a portion of the cover assembly 112 (also see FIGS. 1 and 2) in accordance with certain embodiments. FIG. 3 shows a perspective view 300 of the example casing 130. FIG. 4 shows a perspective view 400 of the example casing 130 from a different angle. FIG. 5 shows a top view 500 of the example casing 130. FIG. 6 shows a bottom view 600 of the example casing 130. FIG. 7 shows a first side view 700 of the example casing 130. FIG. 8 shows a second (opposite) side view 800 of the example casing 130.

As shown in FIGS. 3 through 8, the example casing 130 defines a flat inner surface 150, a smooth outer surface 152, and a recess (or space) 154 within which to position a set of couplings 122 connecting two hoses 110 (FIGS. 1 and 2). The flat inner surface 150 enables multiple casings 130 to neatly fit together around and capture the set of couplings 122 within a chamber formed by the recesses 154.

Accordingly, when the multiple casings 130 are installed around the set of couplings 122 to form a cover assembly 112 and the cover assembly 112 resides on a ground surface, the set of couplings 122 are held within the chamber and protected against impact damage. Additionally, the tidy fit between the multiple casings 130 and the smooth outer surfaces 152 prevents the cover assembly 112 and the set of couplings 122 from snagging/catching on objects in the environment thus protecting the hoses 110 against encountering stresses and damage that would otherwise be incurred if the set of couplings 122 were exposed and able to catch on snag points.

As further shown in FIGS. 3 through 8, the casing 130 defines an elongated raised boss 160 and an elongated pocket 162. The elongated raise boss 160 extends outwardly from the flat inner surface 150. Furthermore, the elongated pocket 162 extends inwardly into the flat inner surface 150.

The elongated raised boss 160 and the elongated pocket 162 are positioned such that when two identical casings 130 are brought together to form the cover assembly 112 (e.g., by fitting the casings 130 together around hose couplings 122), the elongated raised boss 160 of one casing 130 engages with the elongated pocket 162 of the other casing 130. With such engagement, the casings 130 are prevented from sliding, twisting, etc. relative to each other.

As further shown in FIGS. 3 through 8, the casing 130 defines a set of alignment grooves 170, a set of shelves 172, and a set of snap-fit beams 174. Such features enable the casing 130 to capture (e.g., lock with) another casing 130 in a snap-fit manner. In particular, the set of snap-fit beams 174 align with the set of grooves 170 and slightly bend outward and back (e.g., via ramped beam ends and cantilever action) to engage with the set of shelves 172.

To disengage the casings 130, the set of snap-fit beams 174 are simply moved outwardly (e.g., by hand, by a tool, etc.) to no-longer receive interference from the set of shelves 172. As a result, the casings 130 are then separated and the cover assembly 112 is disassembled.

In some embodiments, there are two alignment grooves 170(A), 170(B) and two shelves 172(A), 172(B) on a first side 176(1) of the casing 130. Additionally, there are two snap-fit beams 174(A), 174(B) on a second (or opposite) side 176(2) of the casing 130. Such embodiments enable the cover assembly 112 to be formed by two identical casings 130 which are brought together such that the two snap-fit beams 174(A), 174(B) engage with the two grooves 170(A), 170(B) and the two shelves 172(A), 172(B) of the other casing, and vice versa. In this situation, the first side 176(1) of one casing 130 is aligned with the second side 176(2) of the other casing 130, and vice versa (also see FIGS. 1 and 2).

It should be understood that two snap-fit connections on each side of the cover assembly 112 provide robust and reliable connection of the casings 130. Along these lines, the tolerances and pliability may be set to further provide little to no wiggle, sliding, accidental release, and so on.

Nevertheless, other arrangements are suitable as well. For example, the cover assembly 112 may have a different number of snap-fit connections on each side such as one, three, four, etc. As another example, the casings 130 may not be identical (e.g., one casing may have alignment grooves 170 and shelves on both sides 176(1), 176(2), and the other casing may have snap-fit beams 174, etc.). Moreover, connecting mechanism other than cantilever beams may be used (e.g., hook and loop, clamps, combinations thereof, etc.).

Additionally, in some embodiments, the formed cover assembly 112 defines a set of drain ports (e.g., one or more drainage holes) 180 that allows any fluid that escapes from the set of couplings 122 into the chamber formed by the recesses 154 to exit the chamber. As shown in FIGS. 3 through 8 and by way of example, the casing 130 defines one centrally located drain port 180 thus providing the cover assembly 112 with two drain ports 180 radially extending in opposite directions. In other arrangements, the cover assembly 112 may be provisioned with a different number of drain ports 180 (e.g., three, four, etc.) and/or position the drain ports 180 in different locations (e.g., side-by-side in the center, along the ends 140, along the sides/edges 176, combinations thereof, etc.). Further details will now be provided with reference to FIG. 9.

Figure 9:
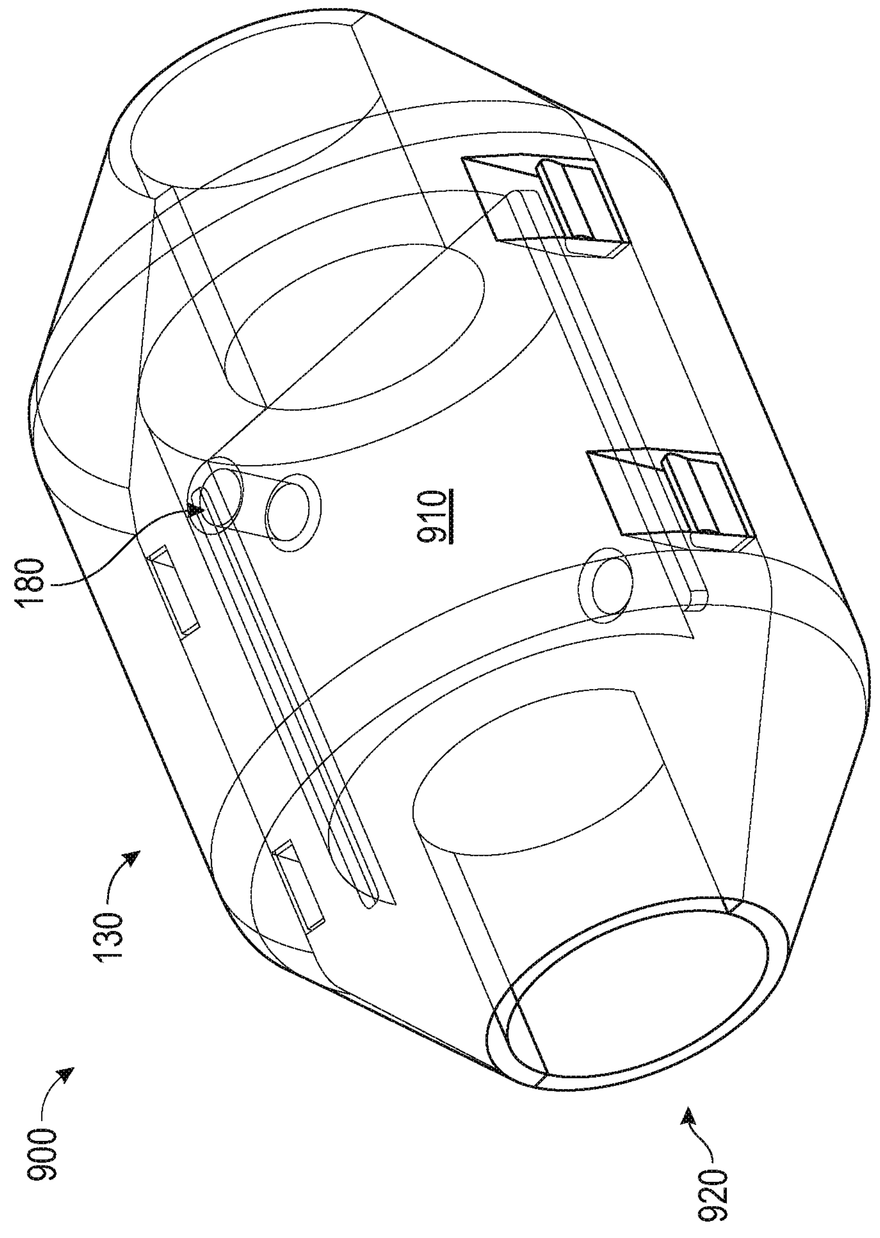
FIG. 9 is a partially transparent view of a cover assembly of the hose system in accordance with certain embodiments.

FIG. 9 is a view 900 of a cover assembly 112 formed by two casings 130 where the casing 130 on the bottom is shown in solid form while the casing 130 on the top is shown in transparent form to more easily identify certain features/details. Along these lines, the chamber 910 is of sufficient size to fully encapsulate the set of couplings 122 of the hoses 110 and thus provide impact protection to the set of couplings 122 and prevent the set of couplings 122 from snagging on snag points in the environment (also see FIGS. 1 and 2).

In some arrangements, the chamber 910 and the openings 920 on the end sections 140 through which the sections of hose 120 extend are sized large enough to allow the cover assembly 112 to conveniently rotate about the set of couplings 122. Such a feature further reduces friction on the hoses 110 when the hoses are dragged over a ground surface. Along these lines, the hose sections 120 and/or couplings 122 serve as an axle about which the cover assembly 112 rotates.

In some arrangements, the cover assembly 112 maintains the set of couplings 122 in a connected state. Along these lines, the cover assembly 112 shields the set of couplings 122 from interference due to snagging on an object, impacting an object, rotating or actuating relative to each other, etc. For example, the openings 920 may be sized so that the cover assembly 112 contacts the hose sections 120 but does not contact the couplings 122 to enable casing rotation without undoing the couplings 122 from each other (e.g., see FIGS. 1 and 9). Accordingly, the hoses 110 will not inadvertently detach from each other and instead stay connected.

It should be appreciated that when the cover assembly 112 provides a slightly tighter fit around the hose sections 120 compared to around the couplings 122, the cover assembly 112 provides stress relief for the couplings 122 and hose ends while connected thus further protecting the hoses 110 against damage. Further details will now be provided with reference to FIG. 10.

Figure 10:
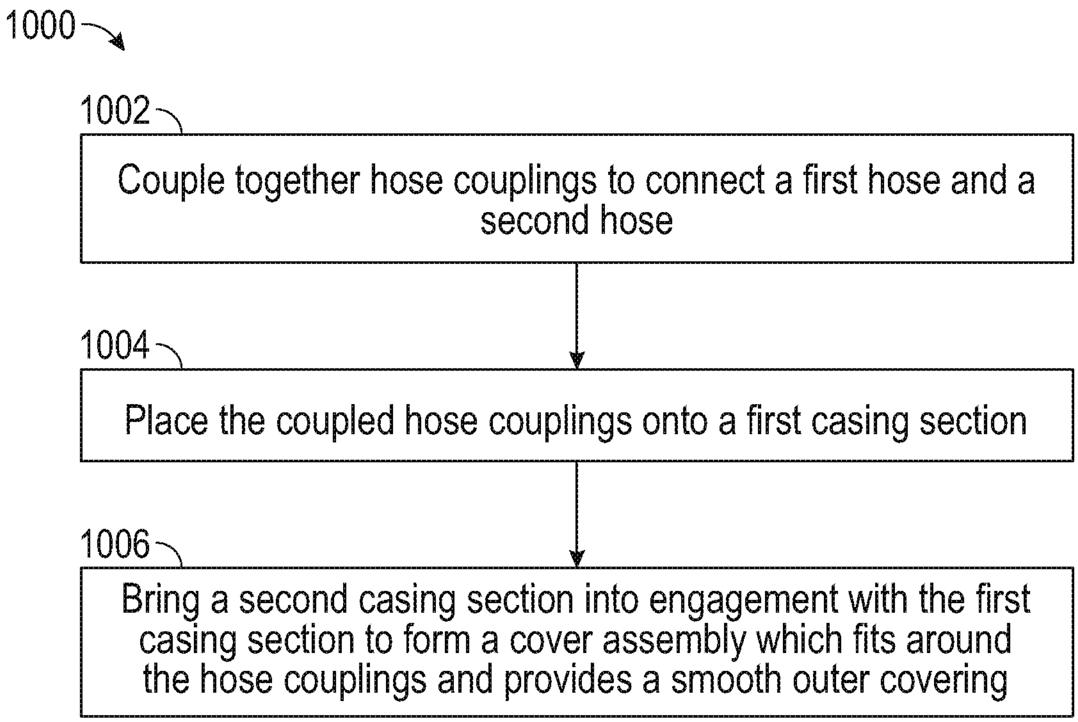
FIG. 10 is a flowchart of a procedure to provide hose coupling protection in accordance with certain embodiments.

FIG. 10 is a flowchart of a procedure 1000 to provide hose coupling protection in accordance with certain embodiments. The procedure 1000 may be performed by a set of human operators (i.e., one or more operators).

At 1002, the set of operators couples together hose couplings to connect a first hose and a second hose. For example, in the context of fire hoses, the set of operators may couple together fire hoses to provide additional range to transfer water or other fire retardant material.

At 1004, after the hose couplings are coupled together, the set of operators places the hose couplings onto a first casing section. Along these lines, the hose couplings may fit within a recess of the first casing section (e.g., also see FIGS. 3 through 8).

At 1006, after the hose couplings are placed onto the first casing section, the set of operators brings a second casing section into engagement with the first casing section to form a cover assembly which fits around the hose couplings and provides a smooth outer covering. As mentioned earlier in connection with FIGS. 3 through 8, the casing sections may be moved directly toward each other and snap-fit together for robust and reliable engagement.

At this point, the hose couplings reside within the chamber of the cover assembly, and derive protection from the cover assembly. Along these lines, the cover assembly shields the hose couplings from impact damage, wear and damage from snagging, stresses from hose couplings becoming snagged and pulled, and so on.

As described above, improved techniques involve utilizing a hose coupling protection apparatus that protects hose couplings 122 which connect hoses 110 together. Such an apparatus includes a cover assembly 112 that provides a smooth outer surface (or covering) 150 around the hose couplings 122 when the cover assembly 112 is installed around the hose couplings 122. The cover assembly 112 not only protects the hose couplings 122 against wear and/or damage (e.g., by shielding the couplings 122), the cover assembly 112 also reduces (or removes) the chances for the set of hose couplings to catch on snag points and lifts portions of the hoses 110 off the ground to lower friction between the hoses 110 and the ground. Accordingly, there is less hose fabric/material wear, and less chance for the hoses 110 to become caught or immobilized on the snag points. Moreover, the cover assembly may serve as a buffer against hard impacts to prevent damage (e.g., when dropped, when knocked against other couplings and/or other hard objects, etc.).

While various embodiments of the present disclosure have been particularly shown and described, it will be understood by those skilled in the art that various changes in form and details may be made therein without departing from the spirit and scope of the present disclosure.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

It should be appreciated that a conventional hose fitting may offer some protection itself. However, there is nothing currently available is the firehose size range that would protect firehose connection hardware.

Additionally, a conventional saddle device may enable a hose to sit thereon. However, such a device does not provide any real protection to couplings, and does not provide friction reduction.

Moreover, prior to the improvements disclosed herein, there were no devices available that provide coupler protection that prevent tearing hoses apart due to snags, wearing couplers out due to dragging, lower friction when pulling the hoses, etc. Rather, particularly in all firefighting industries utilizing hoses, there is a need for a manner to ease dragging of hoses and reducing wear and reducing snag points.

In accordance with certain embodiments, a hose coupler protection system provides protection for hose couplers in manned/unmanned applications. Such a system is well suited for use in a variety of fields such as firefighting (e.g., for use in firefighting tools and equipment).

In accordance with certain embodiments, the system has a simple self-interlocking design. In some arrangements, there are two halves and both halves are the same geometry.

Moreover, the system is scalable for all hose sizes/coupler types, can be offered as a cheap and wearable item that protects hose couplers, reduces snagging and friction pulling hoses, provides drainage holes in case of improper coupling connection, and allows for easy installation onto hoses and removal from hoses. Use of the system may be manual and/or involve simply hand tools.

In accordance with certain embodiments, the hose coupler protection system (HCPS) is designed to address an issue that is prevalent in both the manned firefighting world as well as the robotic firefighting world as well several other issues. When it comes to pulling fire hose on the ground, a big limiting factor for a person (or people) pulling hose is the weight/friction of the hose and couplers on the ground and as it passes over obstructions. An issue that is more prevalent in the robotic firefighting world is pulling apart hose at the coupler due to the coupler/hose snagging on an obstruction and the robot having the power to keep pulling until something gives.

In accordance with certain embodiments, the hose coupler protection system helps address these issues by providing a low friction surface to drag across the ground/obstructions while also removing the snag points of the couplers and reducing wear on the couplers. The HCPS is a system that allows for a reduction in friction on the coupler union between hoses as well as a slightly lowered friction of the hose the amount of hose that is not touching the ground due to the HCPS.

In accordance with certain embodiments, the hose coupler protection system is a multipiece system that is able to disassemble to encapsulate the hose, then with the alignment feature on the mating faces of the two halves. The halves locate on each other and as the halves are pushed together the retention mechanism engages.

In accordance with certain embodiments, the halves of the HCPS are identical but are able to interlock with itself. The raised boss on one side lines up with a pocket on the other side and provides alignment and strength again fore/aft and transverse shear. The retention mechanism is a clip that grabs a shelf on the opposing half, using a ramped face to allow it to move out of the while pushing the halves together.

The HCPS may be used in a variety of applications. Such applications include robotic firefighting vehicles and/or traditional firefighting in all industrial scale fire environments including:

Battery Manufacturers
Petroleum plants
Warehouses
Airports
Power plants
Military bases Other non-firefighting applications are suitable as well such as irrigation, farming, pumping, and so on.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

What is claimed is:

1. Hose coupling protection apparatus, comprising:

a cover assembly constructed and arranged to install around hose couplings which have been coupled together to connect a first hose and a second hose, the cover assembly providing a smooth outer covering around the hose couplings when the cover assembly is installed around the hose couplings, the cover assembly including:

a first casing section constructed and arranged to have the hose couplings placed therein after the hose couplings have been coupled together, and a second casing section constructed and arranged to be brought into engagement with the first casing section to fit around the hose couplings and form the cover assembly that provides the smooth outer covering around the hose couplings;

wherein at least one of the first and second casing sections defines a set of snap-fit beams;

wherein at least another of the first and second casing sections defines a set of alignment grooves and shelves;

wherein, as the second casing section is brought into engagement with the first casing section, the set of snap-fit beams align with the set of alignment grooves and shelves and the first and second casing sections snap-fit together to form the cover assembly;

wherein the hose couplings include a first firehose coupling and a second firehose coupling;

wherein the first firehose coupling and the first hose form a first firehose assembly;

wherein the second firehose coupling and the second hose form a second firehose assembly; and wherein the cover assembly defines a set of drain ports to drain off any fluid that leaks from the firehose couplings when the cover assembly is installed around the firehose couplings.

2. Hose coupling protection apparatus as in claim 1 wherein the cover assembly defines a first end section which extends around an end of the first hose, a second end section which extends around an end of the second hose, and a midsection which interconnects the first end section with the second end section, the midsection having a larger outer diameter than the first end section and the second end section to lift the ends of first and second hoses above a ground surface when the cover assembly is installed around the hose couplings.

3. Hose coupling protection apparatus as in claim 1 wherein the cover assembly is constructed and arranged to rotate relative to the hose couplings when the cover assembly is installed around the hose couplings.

4. Hose coupling protection apparatus as in claim 1 wherein the cover assembly encapsulates the hose couplings to protect the hose couplings against damage from a ground surface when the cover assembly is installed around the hose couplings.

5. Hose coupling protection apparatus as in claim 1 wherein the cover assembly is constructed and arranged to hold the hose couplings together to maintain connection between the first hose and the second hose when the cover assembly is installed around the hose couplings.

6. Hose coupling protection apparatus as in claim 1 wherein the cover assembly defines a firehose coupling chamber to encapsulate the first and second firehose couplings when the cover assembly is installed around the first and second firehose couplings.

7. Hose coupling protection apparatus as in claim 1 wherein the first casing section defines an elongated raised boss;

wherein the second casing section defines an elongated pocket; and wherein the elongated raised boss defined by the first casing section engages with the elongated pocket defined by the second casing section when the first casing section and the second casing section are fitted around the hose couplings and brought together into engagement.

8. Hose coupling protection apparatus as in claim 7 wherein the second casing section further defines an elongated raised boss;

wherein the first casing section further defines an elongated pocket; and wherein the elongated raised boss defined by the second casing section engages with the elongated pocket defined by the first casing section when the first casing section and the second casing section are fitted around the hose couplings and brought together into engagement.

9. Hose coupling protection apparatus as in claim 1 wherein the first casing section defines a set of snap-fit beams;

wherein the second casing section defines a set of alignment grooves and shelves; and wherein the set of snap-fit beams defined by the first casing section snap-fits into place over the set of alignment grooves and shelves defined by the second casing section when the first casing section and the second casing section are fitted around the hose couplings and brought together into engagement.

10. Hose coupling protection apparatus as in claim 9 wherein the second casing section further defines a set of snap-fit beams;

wherein the first casing section further defines a set of alignment grooves and shelves; and wherein the set of snap-fit beams defined by the second casing section snap-fits into place over the set of alignment grooves and shelves defined by the first casing section when the first casing section and the second casing section are fitted around the hose couplings and brought together into engagement.

11. Hose coupling protection apparatus as in claim 1 wherein the set of snap-fit beams is constructed and arranged to actuate relative to the set of alignment grooves and shelves to disengage the first casing section and the second casing section from each other.

12. Hose coupling protection apparatus as in claim 1 wherein the firehose couplings are constructed and arranged to couple together by threading together; and wherein the cover assembly is constructed and arranged to prevent the firehose couplings from turning and disconnecting from each other while the firehose couplings are threaded together and the cover assembly is installed around the firehose couplings.

13. A method of providing hose coupling protection, comprising:

coupling together hose couplings to connect a first hose and a second hose;

after the hose couplings are coupled together, placing the hose couplings onto a first casing section; and after the hose couplings are placed onto the first casing section, bringing a second casing section into engagement with the first casing section to form a cover assembly which fits around the hose couplings and provides a smooth outer covering;

wherein at least one of the first and second casing sections defines a set of snap-fit beams;

wherein at least another of the first and second casing sections defines a set of alignment grooves and shelves; and wherein bringing the second casing section into engagement with the first casing section includes:

aligning the set of snap-fit beams with the set of alignment grooves and shelves and snap-fitting the first and second casing sections together to form the cover assembly.

14. The method of claim 13, further comprising:

actuating the set of snap-fit beams relative to the set of alignment grooves and shelves to disengage the first casing section and the second casing section from each other.

15. The method of claim 13 wherein the hose couplings are firehose couplings; and wherein the firehose couplings include a first casted metal firehose coupling and a second casted metal firehose coupling which thread together to connect with each other.

16. The method of claim 13 wherein the cover assembly defines a set of drain ports; and wherein the method further comprises:

draining off fluid that leaks from the first and second firehose couplings through the set of drain ports.

17. Hose coupling protection system, comprising:

hose couplings constructed and arranged to couple together to connect a first hose and a second hose; and a cover assembly constructed and arranged to install around the hose couplings when the hose couplings have been coupled together, the cover assembly providing a smooth outer covering around the hose couplings when the cover assembly is installed around the hose couplings, the cover assembly including:

a first casing section constructed and arranged to have the hose couplings placed therein after the hose couplings have been coupled together, and a second casing section constructed and arranged to be brought into engagement with the first casing section to fit around the hose couplings and form the cover assembly that provides the smooth outer covering around the hose couplings;

wherein at least one of the first and second casing sections defines a set of snap-fit beams;

wherein at least another of the first and second casing sections defines a set of alignment grooves and shelves;

wherein, as the second casing section is brought into engagement with the first casing section, the set of snap-fit beams align with the set of alignment grooves and shelves and the first and second casing sections snap-fit together to form the cover assembly;

wherein the hose couplings include a first firehose coupling and a second firehose coupling;

wherein the first firehose coupling and the first hose form a first firehose assembly;

wherein the second firehose coupling and the second hose form a second firehose assembly; and wherein the cover assembly defines a set of drain ports to drain off any fluid that leaks from the firehose couplings when the cover assembly is installed around the firehose couplings.

18. Hose coupling protection system as in claim 17 wherein the set of snap-fit beams is constructed and arranged to actuate relative to the set of alignment grooves and shelves to disengage the first casing section and the second casing section from each other.

19. Hose coupling protection system as in claim 17 wherein the firehose couplings are constructed and arranged to couple together by threading together; and wherein the cover assembly is constructed and arranged to prevent the firehose couplings from turning and disconnecting from each other while the firehose couplings are threaded together and the cover assembly is installed around the firehose couplings.

20. Hose coupling protection system as in claim 19 wherein the firehose couplings include a first casted metal firehose coupling and a second casted metal firehose coupling which thread together to connect with each other.

* * * * *